（12）United States Patent
Thornton et al.

(10) Patent No.: US 10,482,146 B2
(45) Date of Patent: Nov. 19, 2019

(54) SYSTEMS AND METHODS FOR AUTOMATIC CUSTOMIZATION OF CONTENT FILTERING

(71) Applicant: Massachusetts Institute of Technology, Cambridge, MA (US)

(72) Inventors: Jason R. Thornton, Chelmsford, MA (US); Marianne A. Deangelus, Somerville, MA (US); Benjamin Andrew Miller, Cambridge, MA (US); Kevin Kyung Nam, Burlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 95 days.

(21) Appl. No.: 15/591,797

(22) Filed: May 10, 2017

(65) Prior Publication Data

US 2018/0046721 A1    Feb. 15, 2018

Related U.S. Application Data

(60) Provisional application No. 62/334,291, filed on May 10, 2016.

(51) Int. Cl.
*G06F 17/30* (2006.01)
*G06F 16/9535* (2019.01)
*G06N 20/00* (2019.01)

(52) U.S. Cl.
CPC ......... *G06F 16/9535* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2008/0005072 A1* | 1/2008 | Meek | .................. | G06F 16/9535 |
| 2009/0119278 A1* | 5/2009 | Cross | ................ | G06F 17/30864 |
| 2011/0004609 A1* | 1/2011 | Chitiveli | ........... | G06F 17/30648 |
| | | | | 707/759 |
| 2011/0044609 A1* | 2/2011 | Ando | ................ | G11B 20/10527 |
| | | | | 386/248 |
| 2011/0246409 A1* | 10/2011 | Mitra | ...................... | G06F 17/18 |
| | | | | 706/52 |
| 2012/0278316 A1* | 11/2012 | Reznik | .............. | G06F 17/30864 |
| | | | | 707/723 |
| 2014/0358916 A1* | 12/2014 | Anand | ................ | G06F 16/9535 |
| | | | | 707/732 |

(Continued)

*Primary Examiner* — Hung D Le
(74) *Attorney, Agent, or Firm* — McCarter & English, LLP; David R. Burns

(57) ABSTRACT

Exemplary embodiments include a system and method for Automatic Customization of Content Filtering (ACCF). The method includes receiving a search string from a user, creating a first filter based on the search string and searching different types of content stored in different content locations based on the first filter. The search returns a first subset of results to the user based on the first filter. The method further receives an indication of relevance for each one of the results in the first subset from the user. The method dynamically creates a second filter based on the received indications of relevance for the first subset of results. Based on the second filter, a second subset of more relevant results is returned to the user.

13 Claims, 10 Drawing Sheets

(56) References Cited

U.S. PATENT DOCUMENTS

| | | | |
|---|---|---|---|
| 2015/0220656 A1* | 8/2015 | Pandey | G06F 17/30392 707/722 |
| 2016/0085813 A1* | 3/2016 | Setty | G06F 17/30528 705/26.3 |
| 2016/0171584 A1* | 6/2016 | Cao | G06Q 30/0625 705/26.62 |
| 2017/0161685 A1* | 6/2017 | Jennings | G06Q 10/1053 |

* cited by examiner

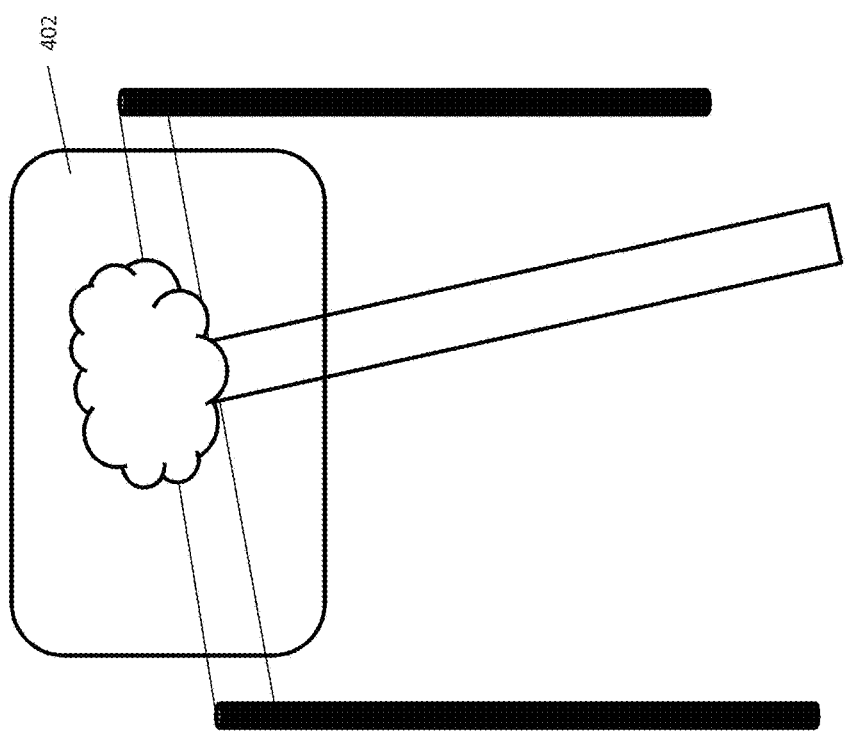

SYSTEMS AND METHODS FOR AUTOMATIC CUSTOMIZATION OF CONTENT FILTERING

RELATED APPLICATION

This application claims the benefit of, and priority to, U.S. Provisional Patent Application No. 62/334,291, entitled "Systems and Methods for Automatic Customization of Content Filtering", filed May 10, 2016, the content of which is incorporated herein by reference in its entirety.

STATEMENT OF GOVERNMENT INTEREST

This invention was made with Government support under Contract No. FA8721-05-C-0002 awarded by the U.S. Air Force. The Government has certain rights in the invention.

BACKGROUND

Recent years have seen an explosive growth in the number of digitally-generated text, image, video, and audio "big data" sources that are increasingly accessible via online archives. The volume of data leads to a need to search for, or to monitor, particular types of content available via open data sources (e.g., social media, content-hosting sites on the Internet) or closed data sources (e.g., standalone archives, seized media). The most commonly used technique to sort through such data is a keyword search, optionally combined with geographical or temporal filters.

SUMMARY

Taught herein are systems and methods for Automatic Customization of Content Filtering (ACCF) performed by forming and continually updating a custom content filter based on user feedback.

Exemplary embodiments include a system and method for ACCF. In one embodiment the system receives a search string from a user, creates a first filter based on the search string and searches multiple modalities of content stored in one or more content storage locations based on the first filter. The search returns a first subset of results to the user based on the first filter. The user reviews the first subset of results and provides an indications of relevance for each result in the first subset of results. The system dynamically creates a second filter based on the received indications of relevance for the results in the first subset. Based on the second filter, the system returns a second subset of results from a second search based on the first and the second filter.

BRIEF DESCRIPTION OF THE DRAWINGS

The skilled artisan will understand that the drawings are primarily for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar or structurally similar elements).

The foregoing and other features and advantages provided by the present disclosure will be more fully understood from the following description of exemplary embodiments when read together with the accompanying drawings, in which:

FIG. 4 illustrates an exemplary image in a search result, according to the present disclosure;

Figure 1:
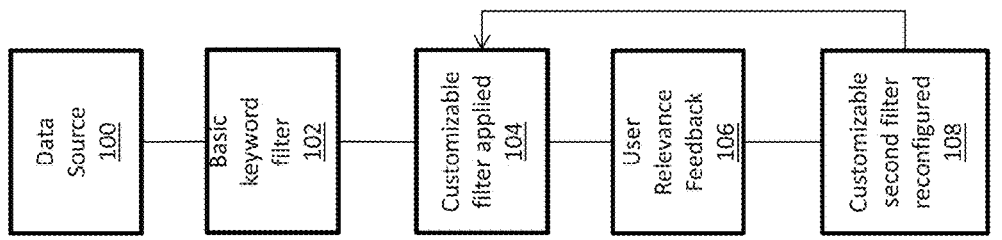
FIG. 1 is a flowchart illustrating an iterative feedback-driven customization process, according to the present disclosure.

Additional features, functions and benefits of the disclosed methods, systems and media will be apparent from the description which follows, particularly when read in conjunction with the appended figures.

DETAILED DESCRIPTION

The recent rapid growth in the quantity of available multimedia data has led to a need for effective multimedia analysis and retrieval aids. Unfortunately conventional techniques for searching tend to yield a mixture of relevant content embedded within sometimes overwhelming amounts of irrelevant content. There are several reasons that traditional mechanisms for searching multimedia content may return inconsistent results. First, keyword queries crafted by a user are sometimes an imprecise expression of the information needed by the user searching because of the ambiguities, imprecision and inconsistent usage patterns of natural language. Secondly, the relevance of a document containing the keyword(s) is sometimes determined not just by the presence or absence of the keywords, but by the context of the keywords use within the document. Additionally, for some multimedia retrieval tasks, the relevance of the content may not be determined by the text component at all but by the content of the associated imagery, video, or audio.

Embodiments of the present invention provide a method, implemented in software, for continual refinement of a customized multimedia content filter based on iterative end-user feedback so as to provide increasingly relevant content to the end-user. Example methodologies and systems describe herein an ACCF system which dynamically learns which feature spaces accommodate discrimination between relevant and irrelevant content. In exemplary embodiments, the system includes receiving a search string from a user. The system creates a first filter using the search string and searches multiple modalities of content using the filter. For example, the modalities can be, but are not limited to, text, image, audio or video content. A first subset of search results from a first search of the various modalities of content that have a high relevance based on the first filter are presented to the user. The user provides indications of relevance (or non-relevance) for each search result in the first subset. Based on the received indications of relevance for the results in the first subset, the system dynamically creates a second customizable filter.

The second customizable filter is used in presenting more relevant results for second and subsequent searches of the multiple content modalities. In one embodiment, the second customizable filter takes the content retrieved by the first filter and extracts features from each content source (containing documents/images/video files, etc.) applying methods from modality-specific toolboxes. This extraction creates a wide range of feature representations for the retrieved content that contains potential indicators of relevance. Once the features have been extracted, each feature space is subjected to a reduction phase in which the dimensionality of the feature representation may be reduced significantly (via an unsupervised learning step) or removed entirely (via a supervised down-selection step). This reduction yields a more compact set of representations for the final step: supervised classification. In this phase, in one embodiment, a joint margin-based classifier across all feature representations is designed based on training data derived from the user feedback to the first subset of results. The scores generated by this classifier are used to rank the documents by relevance. A second subset of search results of various modalities of content including features with high relevance based on the use of the second customizable filter are then presented to the user. The sequence can continue to iterate with the classifier being continually adjusted (and improved) based on user feedback to each subset of data so as to become increasingly accurate in determining relevant data to present to the user.

FIG. 1 is a flowchart illustrating an exemplary iterative feedback-driven customization process, according to the present disclosure. In exemplary embodiments, in operation 100, the system selects a data source. The data sources can be social media platforms, reference databases, search engines and a plurality of other databases and other content storage locations. In operation 102, the system can receive a search string from the user. The search string can be an alphanumeric string. For example, a user can search using a combination of keywords that might indicate first-hand experience with a power outage such as "power" and "out" in the same document or "no" and "power" in the same document on Twitter®. Initially the basic keyword filter is used to return a first subset of results from a first search to the user. For example, the first search can return search results including a first tweet: "Did anyone else's power just go out in the Upper Highlands? #louisville," and second tweet: "No one man can have all the power." The word "power" are in both the first and second tweet. It will be noted that the first tweet is more relevant to a user searching for "first-hand experience with power outages" than the second tweet.

In operation 104, a customizable second filter is used to further filter the results provided by the keyword search. As noted above, the second filter performs a number of actions including extracting features, reducing the feature space and then partitioning the joint feature set into relevant and irrelevant regions using a classifier trained based on user feedback. However, during an initial iteration, the second filter will not include a classifier trained based on the user's feedback (since the feedback hasn't been given yet). Accordingly, in one embodiment, the second filter may be skipped on an initial iteration. In another embodiment, the features may be extracted and the feature space may be reduced but the classifier partitioning may be skipped. In operation 106, the user is presented the search results based on the basic keyword filter and the customizable second filter and provides feedback for each search result as the user views the search results. In exemplary embodiments, the feedback can be binary feedback providing an indication of the relevance or the non-relevance of the search result to the user's initial query. For example, Table 1 illustrates exemplary feedback from a user for the search results based on combinations of keywords relating to potential descriptions of observed power outages on Twitter®.

TABLE 1 illustrates exemplary feedback from a user for the search results

| Relevant | Not Relevant |
| --- | --- |
| Did anyone else's power just go out in the Upper Highlands? #louisville | Let me throw my phone on the charger in case the power goes out |
| Well now my town just went dark, no power | When I get to work the first thing I wanna so is sit down in my office but there's like a girl power meeting in my office ! TF do y'all job! |
| The power is out and I'm in the theater like this well not as dark but it's dark! http://t.co/Qt9gxgDHKL | No one man can have all the power |
| @wmeco Power has been out in Feeding Hills section of Agawam for about 20 minutes. North Westfield St area north of Springfield St | Maybe i should charge my phone . . . U never know how bad itll get and if it knocks out the power |
| Lol, Power just went out in the middle of Kyndall's haircut. | Lol instead of sweeping like a normal person my dad takes out his power tools and sees what he can clean with them. |
| Soooo my power goes out right b4 the game starts cool | NO THREE WORDS HAVE GREATER POWER THAN I LOVE YOU |

In other embodiments, the user can provide feedback using a sliding scale such as 1 to 10. In operation 108, the learning classifier in the customizable second filter is configured using training data based on the user's feedback to help it better select between relevant and non-relevant data in future searches. The system returns to operation 104, and applies the second filter including the trained classifier to subsequent searches.

Figure 2:
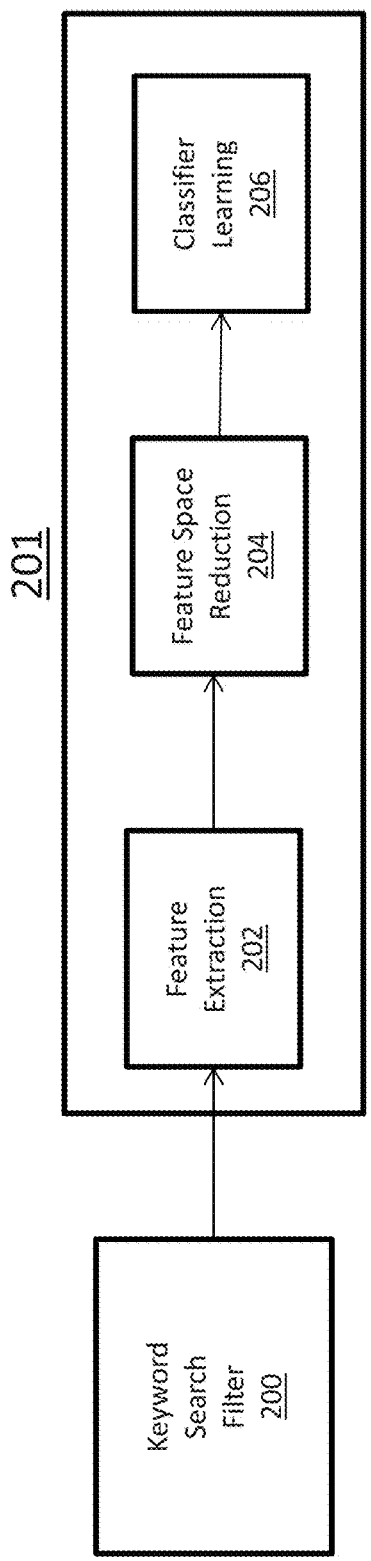
FIG. 2 is a flowchart illustrating an exemplary operation of the customized second filter, according to the present disclosure.
Figure 3A:
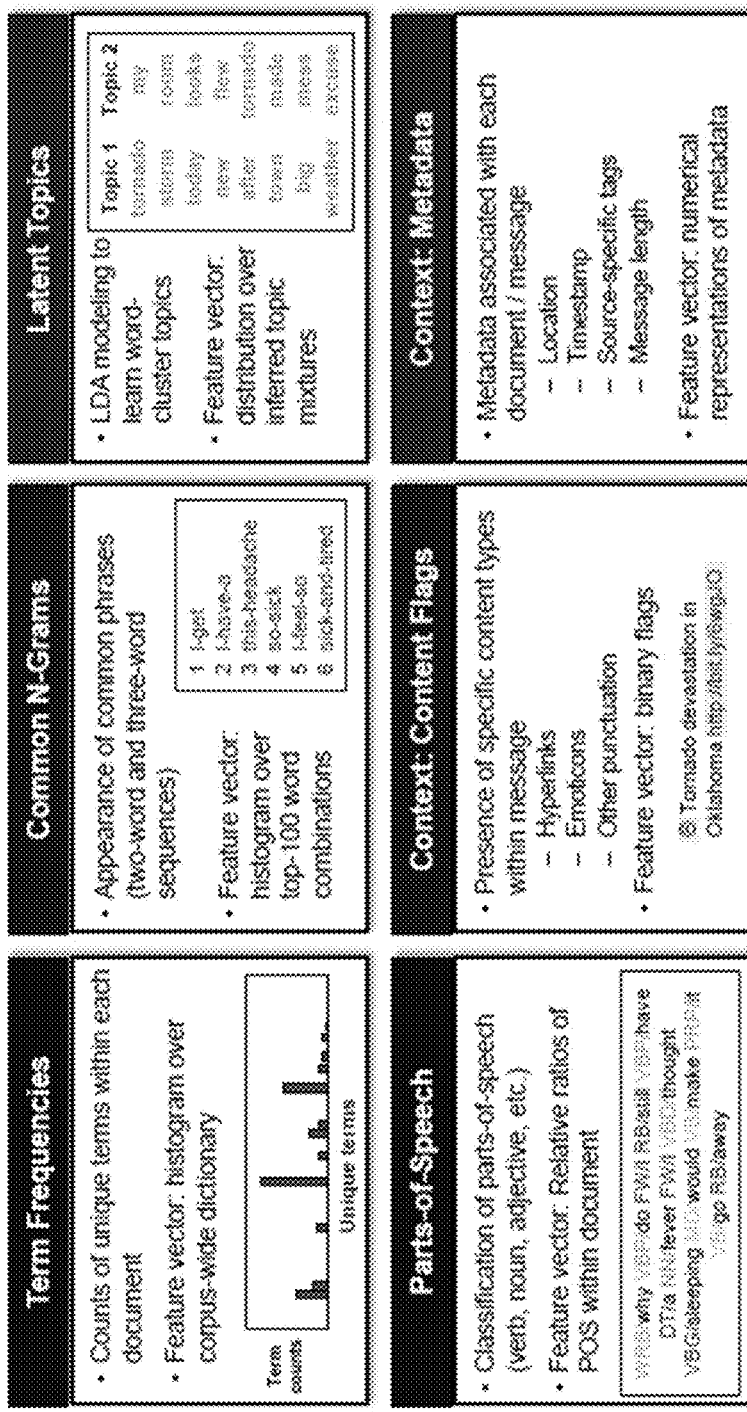
FIG. 3 A-B illustrates methods for extracting features from texts, images and videos, according to the present disclosure.

FIG. 2 is a flowchart illustrating an exemplary operation of the customized second filter, according to the present disclosure. After receiving initial search results provided by execution of the keyword search filter (operation 200), the customized second filter (201) can extract features from each search result operation 202). For example, a first search result can include text, image and video content each including multiple features. With reference to FIG. 3A, the following exemplary feature types can be extracted from the text data:

Term frequencies: Term frequency is a numerical statistic that is intended to reflect how important a word is to a document in a collection or corpus. A quantity of unique terms within each document is calculated. The feature vector includes a histogram over corpus-wide dictionary.

Common N-graph Phrases: An N-gram is a contiguous sequence of n items from a given sequence of text or speech such as an appearance of common phrases (two-word and three-word sequences). The feature vector includes a histogram over top-100 word combinations. For example the following features can be extracted form a possible search result, "I-get, I-have-a, this-headache, so-sick, I-feel-so and sick-and-tired."

Latent Topics: Latent Dirichlet Allocation (LDA) is a generative statistical model that allows sets of observations to be explained by assigning them to a mixture of unobserved groupings. LDA modeling is used to learn word-cluster topics. The feature vector includes a distribution over inferred topic mixtures.

Parts-of-Speech: Parts-of-Speech extraction assigned labels to each word based on a classifier trained to recognize common Parts-of-Speech. The feature vector includes a relative ratios of Parts-of-Speech within the search result.

Contextual Content Flags: Contextual Content Flags indicate the presence of specific content types within a message such as hyperlinks, emoticons and other punctuation. The feature vector includes binary flags. For example, in response to the basic keyword filter and the customizable filter analyzing the following possible search result, "☺ Tornado devastation in Oklahoma http://bit.ly/6wgJO", the emoticon and the hyperlink may be extracted from the tweet as individual features of the tweet.

Contextual Metadata: Contextual Metadata extracts metadata associated with each search result such as location, timestamp, source-specific tags and message length.

Figure 3B:
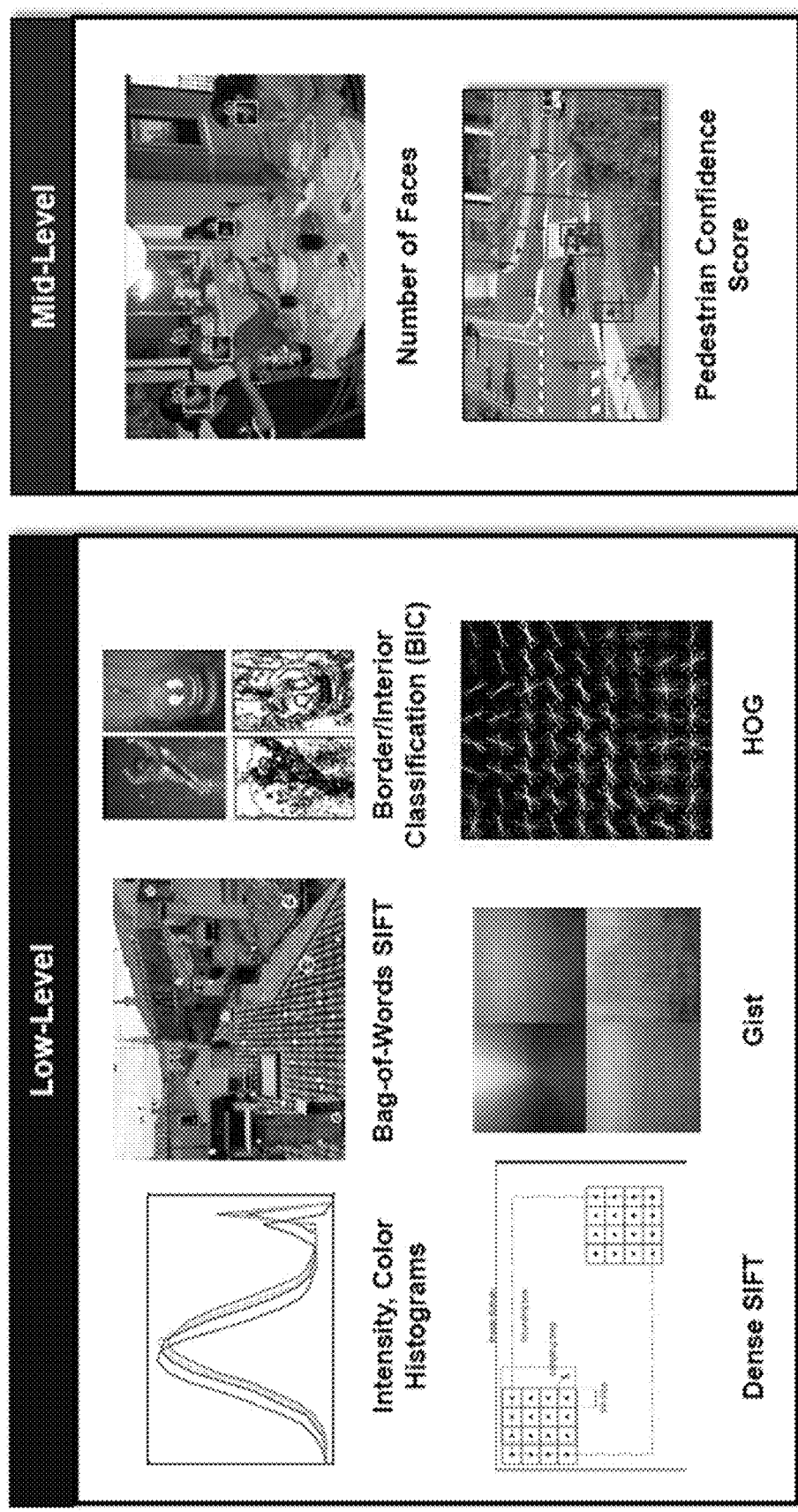

Turning to FIG. 3B, the following exemplary feature types can be extracted from image and video data:

Intensity and Color Histograms: Intensity and Color Histograms are a representation of the distribution of colors and greyscale intensities within an image, which can be indicative of certain object or scene types.

Bag-of-Words Scale-Invariant Feature Transform (SIFT): The Bag-of-Words model counts the number of instances of different types of visual keypoint features in an image.

Border/Interior Classification (BIC): Border/Interior Classification analyzes each pixel of an image and classifies each pixel as being a part of the border or the interior of the image.

Dense SIFT: The Dense SIFT descriptor divides the image into a grid of cells and derives a SIFT descriptor for each cell based on an analysis of oriented gradients.

GIST: The GIST descriptor provides a low-dimensional summary of the gradients at different scales, orientations, and locations within an image. The purpose is to create a high-level representation of the basic shapes and textures contained within a scene. The gradient information for different parts of an image. The gradient information can provide a summary of the scene within an image. The GIST descriptor can generate a representation of the scene without using segmentation. Based on the representation, the GIST descriptor can provide a high-level description of scene in the image.

HOG: The Histogram Orientation Gradients (HOG) descriptor forms the basis of many successful object detection techniques applied to images. The HOG descriptor counts instances of gradient orientation/direction in localized portions/regions of an image.

Number of Faces: Face detection identifies human faces in digital images. The descriptor is the count of all instances of detected faces.

Pedestrian Confidence Score: The Pedestrian Confidence Score applies a pedestrian classifier to an image using a sliding window technique, and takes the maximum confidence score generated by the classifier as an indicator of overall likelihood that the image contains at least one pedestrian.

It should be appreciated that the description contained herein of the specific text, video and image features that may be extracted by the customized second filter is illustrative and the invention is not so limited, either to the particular modalities described or to the particular features in the different content modalities. Other modalities and other features, in addition to those specifically described herein, should be considered to be within the scope of the present invention.

In a non-limiting example, a user can perform a keyword search to find potential first-hand descriptions of power outages on Twitter®. The basic keyword filter or the customizable filter can search for all retrieved tweets containing the relevant text, images or videos. Various features from the tweets can be extracted to determine the relevance of the tweets. For example, one tweet can be classified as relevant because of its use of particular text phrases or discussion topics, (as measured by N-gram or topic model histogram features). With reference to FIG. 4, another tweet can be classified as relevant because of the visual content in its associated imagery, such as a tree leaning on power lines 402 (as measured by edge content, color content, and object recognition features).

Turning back to FIG. 2, in operation 202 a feature space is created for each feature extracted from the text, image or video data from the possible search results. Once the features have been extracted, each feature space is subjected to a reduction phase (operation 204) in which the dimensionality of the feature representation may be reduced significantly (via an unsupervised learning step) or removed entirely (via a supervised techniques). Unsupervised learning is a type of machine learning algorithm used to draw inferences from datasets consisting of input data without labeled responses. Supervised learning is the machine learning task of inferring a function from labeled training data.

Figure 5:
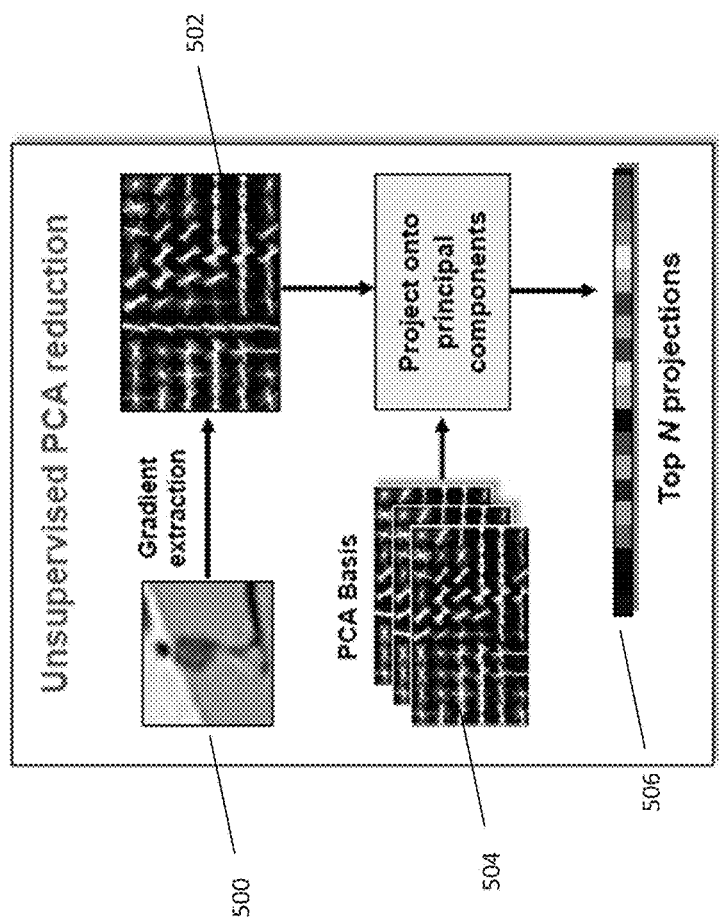
FIG. 5 illustrates unsupervised Principle Component Analysis (PCA) feature reduction, according to the present disclosure.

With reference to FIG. 5, for image or video data, dimensionality reduction removes redundancies and uninformative features. A feature 502 can be extracted from the image 500. The feature 502 can be further reduced using an unsupervised learning technique large feature space reduction via Principle Components Analysis (PCA). PCA is a statistical procedure that uses an orthogonal transformation to convert a set of observations of possibly correlated variables into a set of values of linearly uncorrelated variables called principal components. The number of principal components can be less than or equal to the number of original variables. The resulting vectors 504 are an uncorrelated orthogonal basis set. The vectors 504 are then projected on to the principle components resulting in the top N projections 506. PCA can be used to discover important features of a larger image. Furthermore, PCA can be used to reduce large dimensionality of the data space such as an image to the smaller dimensionality of feature space. Dimensionality reduction removes redundancies and uninformative features.

Supervised learning techniques such as feature space down-selection can also be used to remove features that are redundant or do not provide any value in distinguishing between relevant and irrelevant content. The feature space down-selection step can be treated as an optimization problem, where the subset of feature spaces that supports the most accurate classification on labeled data is selected. To determine this optimal subset of feature spaces, a greedy optimization technique can be applied, in which feature spaces are selected one at a time for inclusion into the optimal subset as long as an improvement in classification performance on labeled data is achieved. Consequently, only the most effective feature space combinations (that are suited to the particular content search task) will be utilized. This selected subset may differ greatly from one search task to the next, highlighting the importance of starting with a diverse multi-modal set of candidate feature spaces.

Turning back to FIG. 2, in operation 206 a classifier is trained as to the relevance of the various feature spaces. As described above, after the features are extracted from the text, image or video search result, a feature space is created. Subsequently, the feature space is reduced to avoid redundancies and uninformative features. A joint margin-based classifier across all remaining feature spaces is designed based on training data derived from the user feedback (i.e. from the indications of relevancy received from the user with respect to previous search results).

Figure 6:
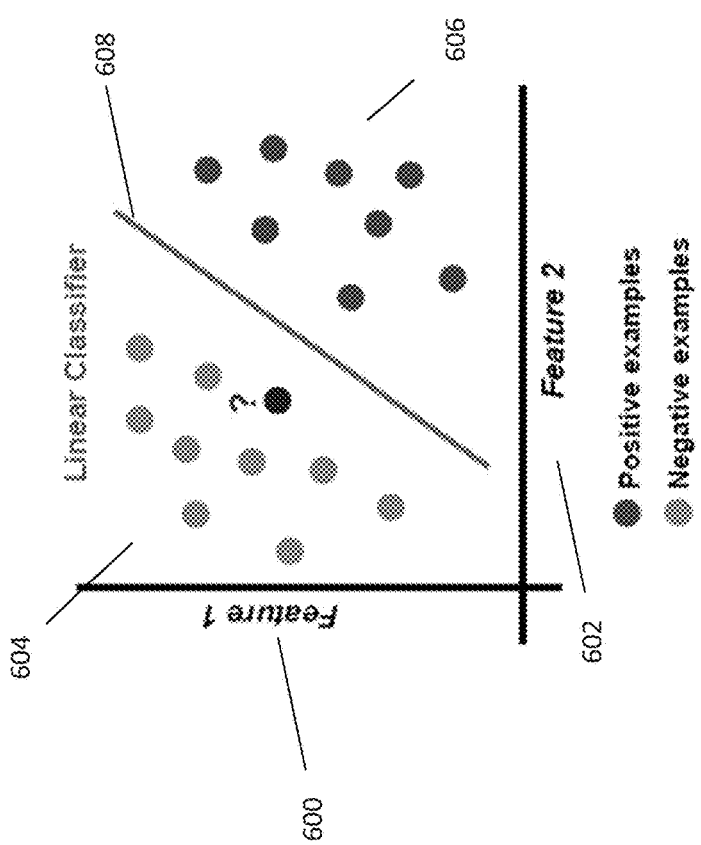
FIG. 6 illustrates a representation of a linear classifier Support Vector Machine (SVM), according to a present disclosure.

With reference to FIG. 6, a linear classifier 608 is trained with respect to each feature based on examples from previous times the user provided feedback. The linear classifier 608 learns to partition joint feature set into relevant and irrelevant regions. For example, positive and negative examples of features from previous search results are collected based on previous user feedback. The linear classifier 608 learns to distinguish the negative examples 604 from the positive examples 606 for Feature 1 600 and Feature 2 602 based on the previous user feedback with respects to the relevance of a search result. The linear classifier 608 uses a support vector machines (SVM). SVM's are supervised learning models with associated learning algorithms that analyze data used for classification and regression analysis. In the exemplary embodiment, the linear classifier 608 uses SVM to generate a score for each search result based on the position of that search result in the selected feature space and the orientation of the linear classifier that partitions the feature space into "positive" and "negative" regions. The scores generated by the linear classifier 608 are used to rank the search results by relevance.

Figure 7:
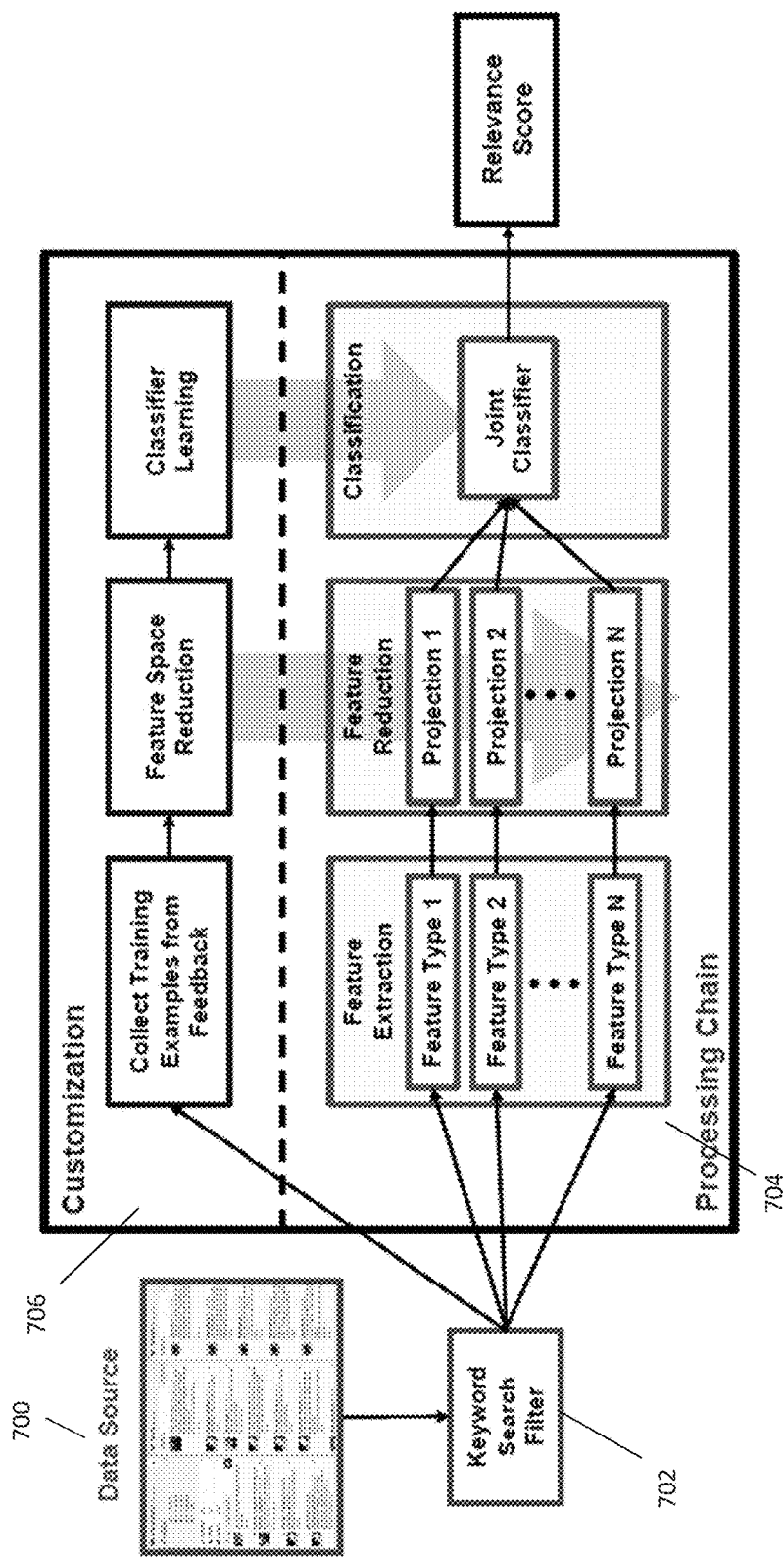
FIG. 7 illustrates a customizable filter framework, according to a present disclosure.

FIG. 7 illustrates a customizable filter framework, according to a present disclosure. In exemplary embodiments, the user can provide feedback on each search result in real-time and the customizable filter can dynamically learn from the user's feedback and adjust the future search results. A search string can be searched from the data source 700 and pass through a keyword search filter 702. Within the customizable filter framework, the search process 704 and the customization process can flow 706 in parallel. The training examples can be collected based on real-time user feedback while in parallel features from a future search result can be extracted. For example, as the user is providing feedback on search results so that the customized second filter can collect positive and negative examples of features in the search results presented to the user, the framework can extract features and create a feature space of a future search result in parallel. The feature space can be reduced to avoid redundancies and uninformative features. Subsequently, the classifier can learn to partition the joint feature space based on the positive and negative training examples from the feedback and in parallel the classifier can score the possible search result based on its position in the joint feature space relative to the learned partition. The higher the relevance score the more relevant the search result is to the user. The lower the relevance score the less relevant the search result is to the user.

As a non-limiting example, the user can search "power outage," and the search can return a result with an image of a neighborhood street with a tree fallen powerlines. The customizable second filter can learn to recognize relevant text and relevant portions of the imagery based on positive and negative examples search results previously viewed by the user, and factor that into the relevance score. If that result has a high score (exceeding a pre-defined criteria), the image will be presented to the user as a relevant search result.

In one embodiment, the user may use an embodiment of the ACCF system of the present invention to search social media or other available data while performing disaster response operations, or public health monitoring. In another embodiment, the system may be used to monitor social media for law enforcement purposes.

Figure 8:
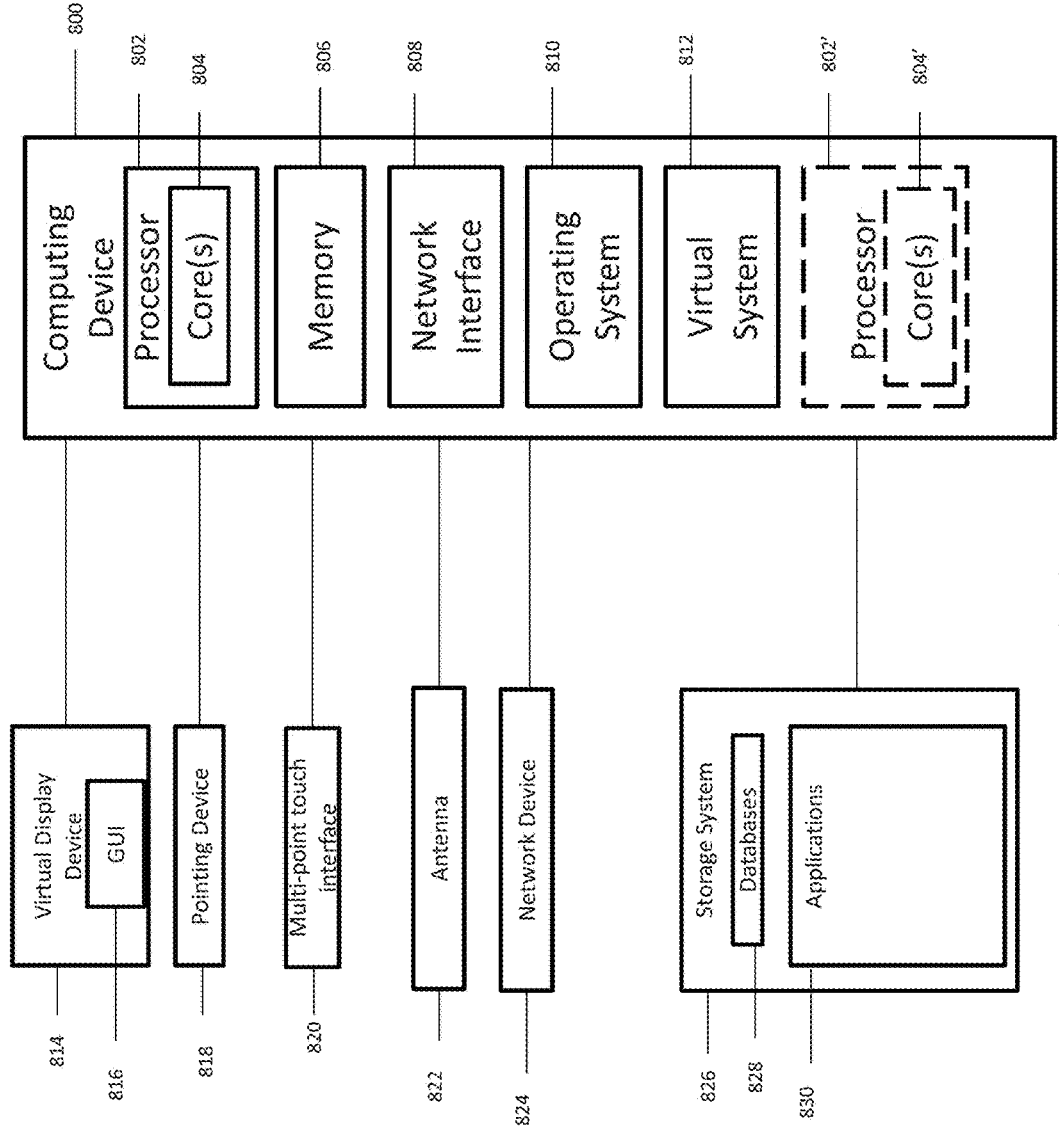
FIG. 8 is a block diagram of an example computing device for implementing exemplary embodiments of the present disclosure.

FIG. 8 is a block diagram of an example computing device for implementing exemplary embodiments of the present disclosure. An exemplary embodiment of the ACCF system can be implemented by the computing device. The computing device 800 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 806 included in the computing device 800 may store computer-readable and computer-executable instructions or software (e.g., applications 830) for implementing exemplary operations of the computing device 800. The computing device 800 also includes configurable and/or programmable processor 802 and associated core(s) 804, and optionally, one or more additional configurable and/or programmable processor(s) 802' and associated core(s) 804' (for example, in the case of computer systems having multiple processors/cores), for executing computer-readable and computer-executable instructions or software stored in the memory 806 and other programs for implementing exemplary embodiments of the present disclosure. Processor 802 and processor(s) 802' may each be a single core processor or multiple core (804 and 404') processor. Either or both of processor 802 and processor(s) 802' may be configured to execute one or more of the instructions described in connection with computing device 800.

Virtualization may be employed in the computing device 800 so that infrastructure and resources in the computing device 800 may be shared dynamically. A virtual machine 812 may be provided to handle a process running on multiple processors so that the process appears to be using only one computing resource rather than multiple computing resources. Multiple virtual machines may also be used with one processor.

Memory 806 may include a computer system memory or random access memory, such as DRAM, SRAM, EDO RAM, and the like. Memory 806 may include other types of memory as well, or combinations thereof. A user may interact with the computing device 800 through a visual display device 814, such as a computer monitor, which may display one or more graphical user interfaces 816, multi touch interface 820, and a pointing device 818. The computing device 800 may also include one or more storage devices 826, such as a hard-drive, CD-ROM, or other computer readable media, for storing data and computer-readable instructions and/or software that implement exemplary embodiments of the present disclosure (e.g., applications). For example, exemplary storage device 826 can include one or more databases 828 for storing information regarding the physical objects. The databases 828 may be updated manually or automatically at any suitable time to add, delete, and/or update one or more data items in the databases.

The computing device 800 can include a network interface 808 configured to interface via one or more network devices 824 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 822 to facilitate wireless communication (e.g., via the network interface) between the computing device 800 and a network and/or between the computing device 800 and other computing devices. The network interface 408 may include a built-in network adapter, network interface card, PCMCIA network card, card bus network adapter, wireless network adapter, USB network adapter, modem or any other device suitable for interfacing the computing device 800 to any type of network capable of communication and performing the operations described herein.

The computing device 800 may run any operating system 810, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 800 and performing the operations described herein. In exemplary embodiments, the operating system 810 may be run in native mode or emulated mode. In an exemplary embodiment, the operating system 810 may be run on one or more cloud machine instances.

Figure 9:
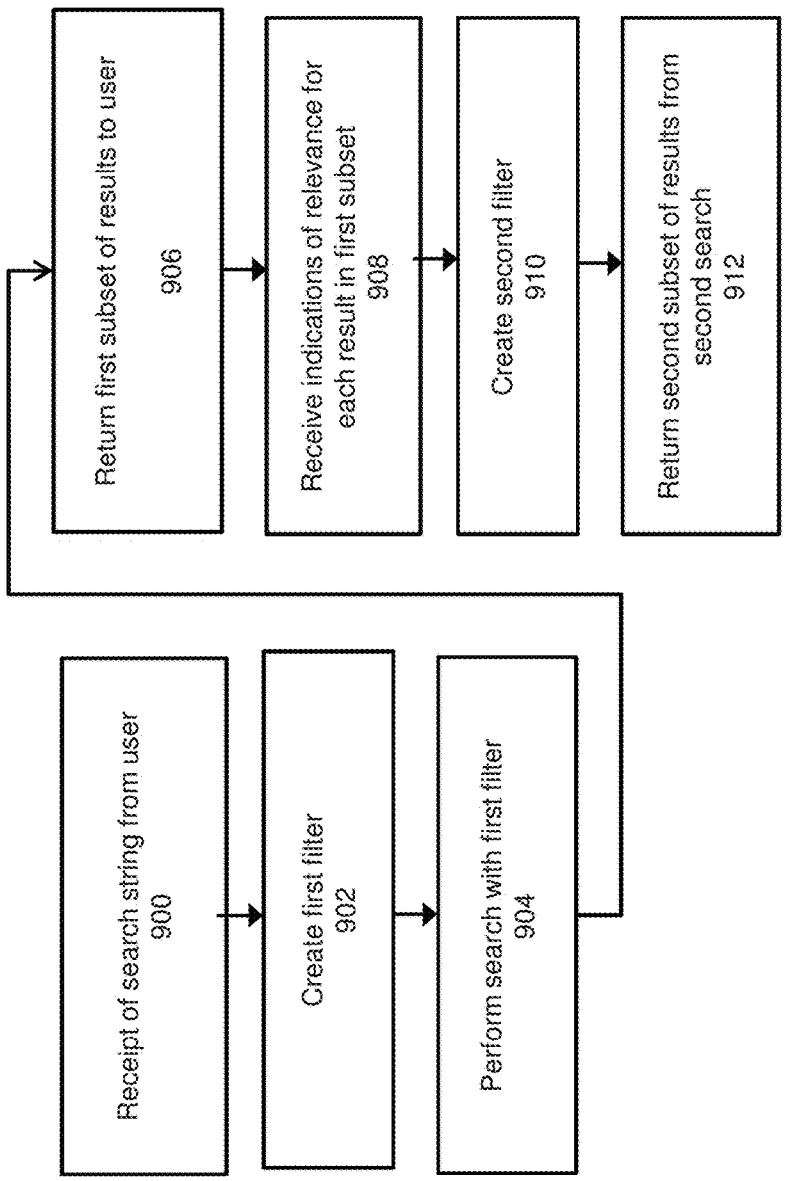
FIG. 9 depicts an exemplary sequence of steps for customization of content filtering in an exemplary embodiment.

FIG. 9 depicts an exemplary sequence of steps for customization of content filtering in an exemplary embodiment. The sequence begins receiving a search string from a user (operation 900). A first filter is created based on the search string (operation 902) and a first search of multiple content modalities stored in multiple locations is performed based on the first filter (operation 904). A first subset of results is returned from the first search to the user (operation 906). An indication of relevance is received from the user for each one of the results in the first subset (operation 908) and a second filter is dynamically created based on the received indications of relevance for the results in the first subset (operation 910). A second subset of results from a second search based on the first and second filter is then returned to the user (operation 912).

In an alternative embodiment, the customizable second filter will continuously filter and present search results of a data source to the user until receiving indication from the user to stop searching. The data source can be a live feed, which is continuously updating and changing. As a non-limiting example a user can search the phrase "power outage" on a social media source such as a timeline on Twitter® and provide feedback on the first subset of search results. The customizable second filter will learn the relevance and non-relevance of the search results based on the user feedback. The results from the social media source can continuously be refreshed by examining newly posted contents using the customizable second filter which is updated after receiving each user feedback, with the system only returning search results it has learned to be relevant based on the user feedback. The user can stop submitting feedback (and therefore stop reconfiguring the customizable second filter) if the user is satisfied by the quality of the results.

It should be appreciated by those skilled in the art that the ACCF system described herein may be implemented in a number of different ways. For example, in one embodiment, the ACCF system may be implemented in a distributed fashion with a client-side computing application running on a client device in communication with a server. The client application may provide a user interface by which the user can enter a search term, receive results from, and provide feedback to, one or more processing modules on the server. The processing module(s) may create and execute the first and second content filters described herein to provide results to a user of the client device. The server may be communicatively coupled to one or more databases or other content sources such as social media platforms whose content may be retrieved and and/or analyzed as described herein.

In another embodiment, a stand-alone application executing on a computing device accessible to a user may create and execute the content filters as described herein on various multimedia content sources to provide more relevant multimedia content search results to the user.

An exemplary flowchart is provided herein for illustrative purposes and is a non-limiting example of a method. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A computing-device implemented method for customization of content filtering, comprising:
   receiving a search string from a user;
   creating a first filter based on the search string;
   performing a first search of a plurality of modalities of content stored in a plurality of locations based on the first filter, the plurality of modalities of content including at least two of text, image and video content;
   returning a first subset of results from the first search to the user;
   receiving from the user an indication of relevance or non-relevance for each one of the results in the first subset;
   dynamically creating a second filter by:
     creating a plurality of feature spaces by extracting a plurality of features from the plurality of modalities of content referenced by the first subset of results, the extracted features including at least two types of text features including two or more of N-Grams, latent topics, parts-of-speech, contextual content flags and contextual metadata, and at least two types of image or video features including two or more of intensity and color histograms, bag-of-words scale-invariant feature transform (SIFT), border/interior classification, dense SIFT, GIST, histogram orientation gradients HOG, a number of faces, and a pedestrian confidence score;
     reducing a dimensionality of each feature space in the plurality of feature spaces; and
     applying a classifier trained on the user indication of relevance or non-relevance to the reduced feature spaces; and
   returning a second subset of results to the user generated by applying the classifier.

2. The method of claim 1, further comprising:
   receiving an indication of relevance for each one of the results in the second subset of results from the user;
   dynamically adjusting the second filter based on the received indications of relevance for the results in the second subset; and
   returning a third subset of results from a third search based on the first filter and the adjusted second filter.

3. The method of claim 2, further comprising:
iteratively:
- receiving an indication of relevance from the user for each result in an additional subset of results generated by an additional search of a plurality of modalities of content;
- further adjusting dynamically the second filter based on the received indications of relevance for the results in the additional subset; and
- returning another subset of results based on the first and the further adjusted second filter,
wherein iterations continue until receiving a user indication of acceptable results.

4. The method of claim 1, wherein extracting features from a text modality includes extracting term frequencies.

5. The method of claim 1, further comprising reducing a feature space by removing redundant features.

6. The method of claim 1, wherein the feature space is reduced using one or more of unsupervised techniques and supervised techniques.

7. The method of claim 1, further comprising:
- comparing, with the classifier, extracted features of a modality to features from a plurality of modalities from the first subset of modalities based on the user feedback on the first set of modalities.

8. The method of claim 7, further comprising:
- issuing, via the classifier, a score for each extracted feature based on the comparison of the extracted features of a modality to features from a plurality of modalities from the first subset of modalities.

9. A computing system for customization of content filtering, comprising:
- a computing system including a server operatively coupled to a plurality of content storage locations holding a plurality of modalities of content including at least two of text, image and video content, the computing system programmed to:
  - receive a search string from a user;
  - create a first filter based on the search string;
  - perform a first search of a plurality of modalities of content stored in a plurality of locations based on the first filter;
  - return a first subset of results from the first search to the user;
  - receive from the user an indication of relevance for each one of the results in the first subset;
  - dynamically create a second filter by:
    - creating a plurality of feature spaces by extracting a plurality of feature from the plurality of modalities of content referenced by the first subset of results, the extracted features including at least two types of text features including two or more of N-Grams, latent topics, parts-of-speech, contextual content flags and contextual metadata, and at least two types of image or video features including two or more of intensity and color histograms, bag-of-words scale-invariant feature transform (SIFT), border/interior classification, dense SIFT, GIST, histogram orientation gradients HOG, a number of faces, and a pedestrian confidence score;
    - reducing a dimensionality of each feature space in the plurality of feature spaces; and
    - applying a classifier trained on the user indication of relevance or non-relevance to the reduced feature space; and
  - return a second subset of results to the user generated by applying the classifier.

10. The system of claim 9, wherein the computing system is programmed to:
- receive an indication of relevance for each one of the results in the second subset of results from the user;
- dynamically adjust the second filter based on the received indications of relevance for the results in the second subset; and
- return a third subset of results from a third search based on the first filter and the adjusted second filter.

11. The system of claim 10, wherein the computing system is programmed to:
iteratively:
- receive an indication of relevance from the user for each result in an additional subset of results generated by an additional search of a plurality of modalities of content;
- further adjust dynamically the second filter based on the received indications of relevance for the results in the additional subset; and
- return another subset of results based on the first and the further adjusted second filter,
wherein iterations continue until receiving a user indication of acceptable results.

12. The system of claim 9, wherein a feature space is reduced by removing redundant features.

13. The system of claim 12, wherein the feature space is reduced using one or more of unsupervised techniques and supervised techniques.

* * * * *